United States Patent
Kirchhofer

(10) Patent No.: US 9,251,033 B2
(45) Date of Patent: Feb. 2, 2016

(54) AUTOMATIC MONITORING AND JUST-IN-TIME RESOURCE PROVISIONING SYSTEM

(75) Inventor: Richard Kirchhofer, Fremont, CA (US)

(73) Assignee: VCE Company, LLC, Richardson, TX (US)

( * ) Notice: Subject to any disclaimer, the term of this patent is extended or adjusted under 35 U.S.C. 154(b) by 268 days.

(21) Appl. No.: 13/538,910

(22) Filed: Jun. 29, 2012

(65) Prior Publication Data

US 2013/0014107 A1 Jan. 10, 2013

Related U.S. Application Data

(60) Provisional application No. 61/505,513, filed on Jul. 7, 2011.

(51) Int. Cl.
G06F 9/455 (2006.01)
G06F 9/46 (2006.01)
G06F 11/34 (2006.01)
G06F 9/50 (2006.01)

(52) U.S. Cl.
CPC .......... *G06F 11/3442* (2013.01); *G06F 9/5083* (2013.01); *G06F 11/3409* (2013.01); *G06F 2201/81* (2013.01); *G06F 2201/815* (2013.01); *G06F 2209/508* (2013.01)

(58) Field of Classification Search
CPC ... G06F 9/50; G06F 9/5027; G06F 2209/501; G06F 2209/508; G06F 2201/81; G06F 11/3442; G06F 11/30; G06F 11/34
USPC .............................................. 718/1, 104, 105
See application file for complete search history.

(56) References Cited

U.S. PATENT DOCUMENTS

| | | | |
|---|---|---|---|
| 6,377,907 B1* | 4/2002 | Waclawski ................... | 702/182 |
| 6,553,419 B1* | 4/2003 | Ram ............................ | 709/224 |
| 8,271,974 B2* | 9/2012 | Mazhar et al. ............... | 717/177 |
| 2002/0133757 A1* | 9/2002 | Bertram et al. ................ | 714/47 |
| 2003/0105810 A1 | 6/2003 | McCrory et al. | |
| 2004/0122647 A1* | 6/2004 | Monroe et al. ................. | 703/22 |

(Continued)

FOREIGN PATENT DOCUMENTS

| WO | 2010/042729 A2 | 4/2010 |
| WO | 2010/127365 A1 | 11/2010 |

OTHER PUBLICATIONS

Hewlett-Packard Development Company, L.P., "HP Virtual Resource Pools: Key Enabler of Converged Infrastructure Architecture," 2009. pp. 1-3.*

(Continued)

*Primary Examiner* — Meng An
*Assistant Examiner* — Willy W Huaracha
(74) *Attorney, Agent, or Firm* — Polsinelli PC

(57) ABSTRACT

A method and apparatus for automatic provisioning steps using a physical computing block-based infrastructure platform and a virtualized environment is discussed to provide automatic elasticity. Running applications may be monitoring for increased workload, which may trigger a proactive and/or reactive response. The triggered proactive or reactive response includes executing a remediation action upon workloads exceeding set thresholds, as set by a pre-determined monitoring policy. The remediation actions may include the provisioning of additional virtual or physical computing resources to reduce the workload below the set threshold.

19 Claims, 12 Drawing Sheets

(56) References Cited

U.S. PATENT DOCUMENTS

| | | | |
|---|---|---|---|
| 2004/0181794 A1* | 9/2004 | Coleman et al. | 718/104 |
| 2005/0038834 A1* | 2/2005 | Souder | G06F 9/5027 |
| 2007/0094396 A1* | 4/2007 | Takano et al. | 709/226 |
| 2008/0077366 A1* | 3/2008 | Neuse et al. | 703/2 |
| 2010/0042720 A1 | 2/2010 | Stienhans et al. | |
| 2011/0125894 A1 | 5/2011 | Anderson et al. | |
| 2011/0126197 A1 | 5/2011 | Larsen et al. | |
| 2011/0179132 A1 | 7/2011 | Mayo et al. | |
| 2011/0252137 A1 | 10/2011 | Stienhans et al. | |
| 2012/0054763 A1 | 3/2012 | Srinivasan | |
| 2012/0173709 A1* | 7/2012 | Li et al. | 709/224 |
| 2013/0311835 A1* | 11/2013 | Dunne et al. | 714/47.3 |
| 2014/0137110 A1* | 5/2014 | Engle et al. | 718/1 |
| 2014/0201735 A1* | 7/2014 | Kannan | G06F 9/45558 718/1 |
| 2014/0215464 A1* | 7/2014 | Birke | G06F 9/45533 718/1 |

OTHER PUBLICATIONS

International Search Report and Written Opinion, Application No. PCT/US2012/045571, mailed Sep. 9, 2012, 14 pages.

VCE Company: "VBLOCK(TM) Solution for Application Lifecycle Platform", Aug. 31, 2011, pp. 1-33, XP55037795, Retrieved from the Internet: URL: http://www.vce.com/pdf/solutions/vce-alp-reference-architecture.pdf [retrieved on Sep. 11, 2012].

* cited by examiner

| Monitor | Inventory | Alert | Views | | | |
|---|---|---|---|---|---|---|
| Alerts | Configure | | | | | |

▼ 06/18/2011 ▲          Click the 🕐 icon to acknowledge an alert

| ☐ | Priority | Alert Date ▲ | Alert Definition | Alert Condition | Actual Value | Fixed | Ack |
|---|---|---|---|---|---|---|---|
| | !! - Medium | 06/18/2011 08:35 PM | On high Cloud CPU | Cloud CPU > 70.0% | 75.0% | Yes | |
| | !! - Medium | 06/18/2011 08:36 PM | On upscaling complete | Group count value changed | 3.0 | Yes | |
| | !! - Medium | 06/18/2011 08:56 PM | On low Cloud CPU | Multiple conditions | - - | Yes | |
| | !! - Medium | 06/18/2011 08:57 PM | On downscaling complete | Multiple conditions | - - | Yes | |

FIXED    ACKNOWLEDGE      Total: 4    Items Per Page: 15 ▶

FIG. 5

AUTOMATIC MONITORING AND JUST-IN-TIME RESOURCE PROVISIONING SYSTEM

CROSS-REFERENCE TO RELATED APPLICATIONS

This application claims benefit of U.S. provisional patent application Ser. No. 61/505,513, filed Jul. 7, 2011, which is herein incorporated by reference.

BACKGROUND OF THE INVENTION

1. Field of the Invention

Embodiments of the present invention generally relate to a method for allocating computer resources for executing a virtualized environment.

2. Description of the Related Art

Generally, in a virtualized computer environment, virtual machines are configured to run on one or more host computers. Each virtual machine uses CPU and memory resources of one of the host computers and runs its own operating system and application programs to give the appearance that it is operating as a stand-alone computer system. The amount of CPU and memory resources for each of the virtual machines on a host computer can be designated manually by an administrator of the virtualized computer environment or automatically according to resource policies set by the administrator. In some virtualized computer environments, load balancing is enforced across multiple host computers by software that monitors resource usage on different host computers and migrates one or more virtual machines from one host computer to another, e.g., from a busy host computer to one that has excess capacity.

Additionally, enterprises engaged in developing, testing, and deploying their applications must find a way to deal with many layers of the targeted platform. These layers include application services, virtualization, and hardware infrastructure with compute, network, storage, and management at all levels. Information technology (IT) and engineering groups must also focus their energy on acquiring, deploying, and providing ongoing management, as well as making sure all the layers work seamlessly together. This situation increases an enterprise's initial and ongoing cost, extends the development cycle, and reduces flexibility needed to respond to changes in the market.

Further, the traditional enterprise information technology (IT) roles such as server administrator, UNIX administrator, and network, storage or exchange administrator, have been generally static. The roles operate in isolation, or in "silos", which causes friction within IT organizations, as well as between developers and IT. Further, it has been difficult for developers to play the role of IT administrator when their developed applications were deployed as "cloud" applications. This difficulty has been due not only to various access-controls, authentication and authorization complexities, but also to a model of organizational separation between developers and IT, where the default behavior is to "deny access".

Enterprises face several challenges when developing applications for the cloud. Software is increasingly being offered as a service and deployed through the cloud. A new breed of software, referred to as "Web-apps" is being developed by many organizations. Web-apps have an unpredictable traffic workload. Enterprise Software is increasingly developed using languages such as Java and Ruby/Rails and developer frameworks such as Spring. Development cycles are shrinking and products are frequently being deployed on "clouds". Consequently, application owners and software developers must ensure that the new features that they develop are rapidly taken through the dev-build-test-stage-deploy cycle. Finally, traditional IT roles are being turned on their heads when enterprises adopt cloud computing and move to delivery of applications via the software-as-a-service model (SAAS) on a public cloud or private cloud deployment environment As such, there is a demand for a more efficient operational model for accelerated delivery of new IT high-value services.

SUMMARY OF THE INVENTION

The present disclosure generally provides a system solution for an application lifecycle platform (ALP) which provides application developers and owners with full control over the lifecycle of applications. The system solution described herein provides and streamlines the requisite applications and infrastructure resources to develop, test, provision, run, and manage applications in their environment. The solution enables developers to dynamically adjust application and infrastructure resources according to real-time demand. Application owners may set the rules for when to scale up resources, or scale down. This flexibility enables applications owners to meet peak demand to maintain performance standards or to scale down during slow times, in order to balance IT resources for other applications.

The present disclosure generally describes a system architecture for implementing the system solution for application lifecycle platform with a complete stack, from application development services and infrastructure, to system infrastructure, application scalability, and management. ALP may provide rapid deployment and sustainable operation for a virtualized converged infrastructure. The system architecture utilizes a computing block infrastructure platform and a virtualized cloud application platform that provides an automatic elasticity for managing the computing block infrastructure.

Embodiments of the present disclosure provide a method for allocating computer resources in a virtualized environment. The method generally includes monitoring performance of a virtual machine platform comprising one or more virtual machines and determining whether the performance exceeds a threshold value based on a monitoring policy. If the performance exceeds the threshold value, the method further includes executing a remediation process to provision virtual resources for the virtual machine platform.

Embodiments of the present disclosure also provide a method for allocating computer resources in a virtualized environment. The method generally includes monitoring performance of a physical computing platform comprising one or more physical hosts, the physical computing platform executing a virtualized environment and determining whether the performance exceeds a threshold value based on a monitoring policy. If the performance exceeds the threshold value, the method further includes executing a remediation process to provision physical resources for the physical computing platform.

Embodiments of the present disclosure also provide a computer-readable storage medium storing instructions that, when executed by a processor, performs an operation for allocating computer resources in a virtualized environment. The operation includes monitoring performance of a physical computing platform comprising one or more physical hosts, the physical computing platform executing a virtualized environment and determining whether the performance exceeds a threshold value based on a monitoring policy. The operation further includes executing a remediation process to provision physical resources for the physical computing platform if the performance exceeds the threshold value.

Embodiments of the present disclosure also provide a system, comprising a storage device configured to store one or more monitoring policies, and a management server. The management server may be configured to monitor performance of a physical computing platform comprising one or more physical hosts, the physical computing platform executing a virtualized environment and determine whether the performance exceeds a threshold value based on a monitoring policy. The management server may further be configured to execute a remediation process to provision physical resources for the physical computing platform if the performance exceeds the threshold value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates a user interface for displaying monitoring alerts and reports, according to certain embodiments of the present disclosure.

DETAILED DESCRIPTION

Figure 1:
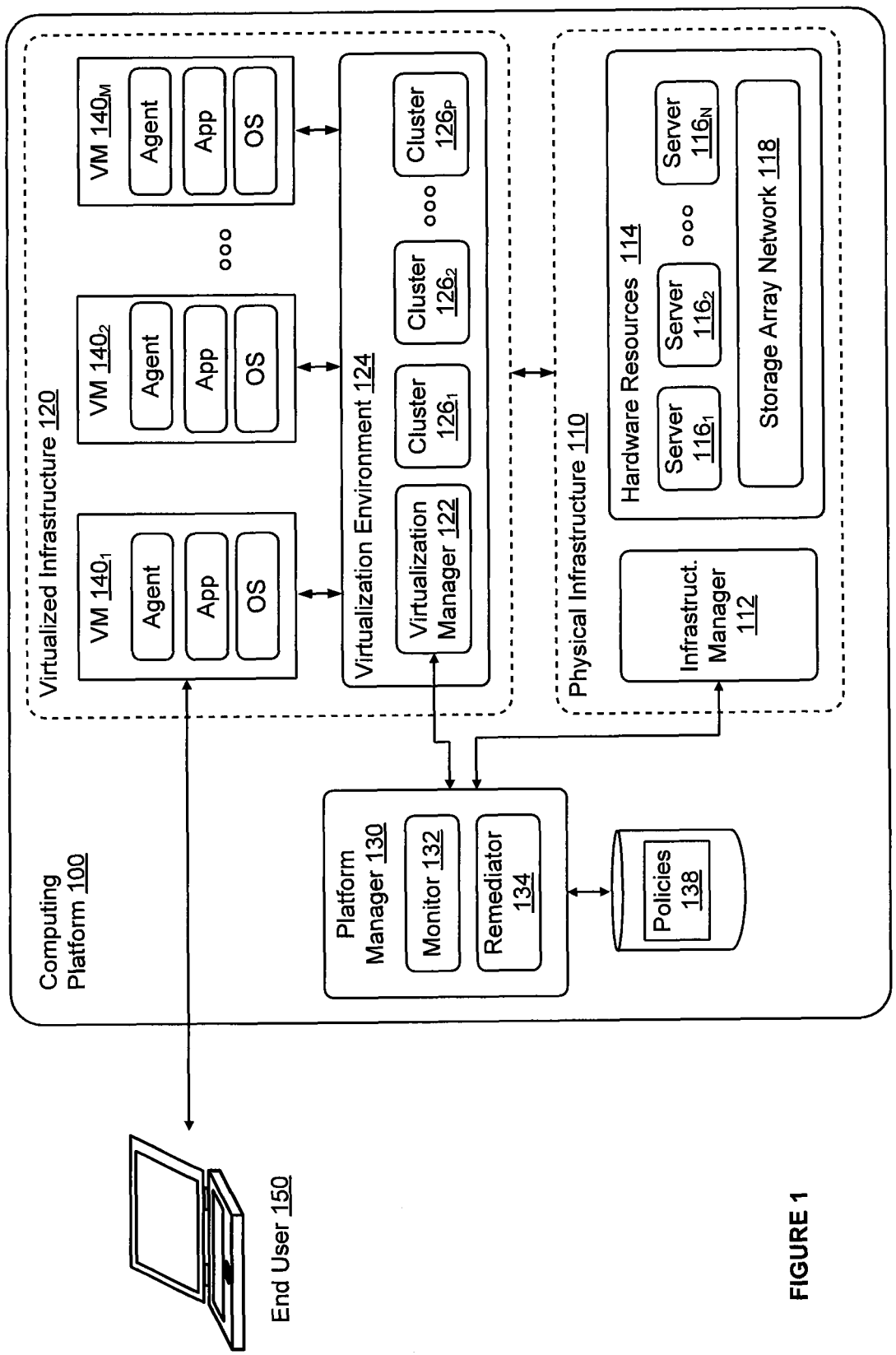
FIG. 1 illustrates a computing system configured for providing a virtualized environment according to one embodiment of the present disclosure.

Embodiments of the present disclosure utilize a computing block platform and a virtualized cloud application platform, utilizing both best-of-breed Platform as a Service (PaaS) with Infrastructure as a Service (IaaS), to provide a complete platform for modern applications. Embodiments of the present disclosure provide customers with what is needed to develop and build their modern applications; the infrastructure and management needed for testing, deploying and dynamically scaling these applications. Embodiments of the present disclosure provide IT with control over quality of service and security, while providing application owners and developers with flexibility, as well as with instant access to needed resources for addressing application demand fluctuation.

As described herein, embodiments of the present disclosure enable application owners to dynamically adjust application and infrastructure resources according to real-time demand. Application owners set the rules for when to scale up resources or scale down resources. Embodiments of the present disclosure provide customers with an approach to implement automatic elasticity. The approach is demonstrated through two use cases. Both use cases ensure proactive elasticity, and reactive (just-in-time) elasticity.

According to one embodiment of the present disclosure, a virtual infrastructure including virtual machines which run different application components may be elastically and automatically expanded based on a pre-determined policy in response to increased application workload. According to another embodiment of the present disclosure, a physical infrastructure, including physical machines which execute a virtualized environment to provide the virtual infrastructure described above, may be elastically and automatically expanded based on a pre-determined policy in response to increased application workload (for example, such as a workload that cannot just be handled by an expansion of virtual infrastructure as described above.)

The solution architecture described herein enables automation of cross-functional operations on physical elements such as servers, network and storage devices, and virtualization layers; on each application lifecycle step; during runtime (post-deployment), through proactive and reactive elasticity and using various configuration elements including hardware, software, tools, components and management elements. The solution uses the following major hardware and software components and technologies. A customer's environment may include additional components based on the application needs.

The solution architecture may be configured to addresses two key system requirements for enterprises. Firstly, infrastructure and IT elasticity needs may be addressed for enterprise application development teams during the application lifecycle stages prior to production deployment of an application. Specifically, these are the development, build, integrate, and test steps for an application that is built by the enterprise and made available via software as a service (SAAS) for the enterprise customers, or for enterprise employees. Secondly, elasticity needs for cloud-deployed enterprise web applications in production may be addressed, typically written in Java or Ruby/Rails using Spring Frameworks.

FIG. 1 illustrates a computing platform 100 configured for providing a virtualized environment according to one embodiment of the present disclosure.

As shown, the computing platform 100 includes a physical infrastructure 110 configured to support a virtualized infrastructure 120. In the particular embodiment shown in FIG. 1, physical infrastructure 110 comprises hardware resources 114, such as servers $116_1$ to $116_N$ (sometimes referred to as "hosts") and one or more storage array networks (SAN), such as SAN 118, communicatively connected by a network (not shown). The virtualized infrastructure 120 may include a virtualization environment 124 comprising one or more virtual machines 140, each connected to one or more users 150 by a communications network (not shown), such as the Internet.

According to one embodiment of the present disclosure, the physical infrastructure 110 may be organized into a "computing-block" based infrastructure, wherein physical infrastructure units are characterized by repeatable units of construction based having similar performance, operational characteristics, and discrete requirements of power, space, and cooling that facilitate rapid deployment, integration, and scalability. The computing-block based infrastructure is configured to dynamically provision hardware resources based on performance demands placed on the physical infrastructure 110. One such example of physical infrastructure 110 is a Vblock™ Infrastructure Platform available from the VCE Company, LLC.

The physical infrastructure 110 further includes an infrastructure manager 112 configured to manage the configuration, provisioning, and policy compliance of the physical infrastructure 110. Infrastructure manager 112 provides an interface by which provisioning of hardware resources 114 (e.g., computing, networking, storage) may be managed with policy-based automation. According to one embodiment, the infrastructure manager 112 may be included in every physical infrastructure 110 to manage the configuration, provisioning, and compliance of computing-block based infrastructure. The infrastructure manager 116 may simplify deployment and integration into IT service catalogs and workflow engines, and dramatically simplifies computing-block platform deployment by abstracting the overall provisioning while offering granular access to individual components for troubleshooting and fault management. According to one embodiment, the infrastructure manager 112 may include a configuration including a list of IP address and system credentials to assign newly provisioned systems. As described in further detail below, the platform manager 130 and/or the virtualized infrastructure 120 may connect to and communicate with the infrastructure manager 116 of the physical infrastructure 110 to manage and/or configure the physical infrastructure 110. One example of an infrastructure manager includes EMC Ionix Unified Infrastructure Manager (UIM) available from EMC Corporation. Similarly, the network may include a network manager configured to configure network devices (e.g., switches, routers) and manage addressing, subnets, virtual local area networks (VLANs), and other network configurations. One example of a network manager includes a Cisco Switch accessible via a Cisco IOS command line interface (CLI) available from Cisco System, Inc.

The virtualized infrastructure 120 includes a virtualized environment 124 configured to simulate (i.e., to virtualize) conventional components of a computing device, e.g., a processor, system memory, a hard disk drive, for executing one or more virtual machines $140_1$ to $140_M$. For example, each virtual machine 140 may include a virtual processor and a virtual system memory configured to execute an application. In one example implementation of an embodiment similar to that of FIG. 1, virtualized environment 124 may be implemented by running VMware vSphere®- or VMware ESX®-based hypervisor technologies on servers $116_1$ to $116_n$ provided by VMware, Inc. of Palo Alto, Calif. (although it should be recognized that any other virtualization technologies, including Xen® and Microsoft Hyper-V virtualization technologies may be utilized consistent with the teachings herein). As described above, a hypervisor application may provide a foundation for building and managing a virtualized IT infrastructure, such as the virtualized infrastructure 120. The hypervisor may abstract processor, memory, storage and networking resources into multiple virtual machines that run unmodified operating systems and applications.

In one embodiment, virtualized infrastructure 120, including VMs 140 to $140_M$, may be configured as a cloud application platform, such as, the VMware vFabric cloud application platform available from VMware, Inc. According to one embodiment, the cloud application platform integrates essential components of a modern application platform. For example, the cloud application platform may include a proven development framework that bypasses the complexity of overweight platforms such as Java Platform, Enterprise Edition (JEE), to simplify and accelerate the development of modern applications. The cloud application platform may further be characterized as a lean runtime platform optimized for both the development framework and virtual infrastructure. The cloud application platform may additionally include a set of runtime services tailored to the needs of modern applications.

According to one embodiment of the present disclosure, the cloud application platform may comprise additional components for enabling a cloud application. In one embodiment, the cloud application platform may comprise a data management application, such as GemFire High Performance Data Management application. The data management application may enable elastic data management for speed and dynamic scalability needed for data-intensive applications, including HTTP session management for Java servers, such as Tomcat and vFabric tc Server, L2 Caching for a Java persistent framework such as Hibernate, and enhanced parallel disk persistence.

According to one embodiment, the cloud application platform may further include a fast and secure HTTP Web Server, such as an Apache web server or a VMware vFabric Web Server available from VMware, Inc. The web server may be a HTTP server and load-balancing component of the cloud application platform, and provides high performance, scalability and security while reducing the cost and complexity of sophisticated web infrastructure. The web server may be easy to deploy, tuned for performance, and be fully supported by the virtualized environment. The web server according to one embodiment generally provides simplified deployment and maintenance, high performance, and high security.

According to one embodiment of the present disclosure, the cloud application platform further includes a messaging platform for applications, such as the RabbitMQ Open Source Enterprise Messaging. According to one embodiment, the message platform provides reliable inter-system messaging and may route data to distributed applications throughout the cloud. The messaging platform may be fully extensible via plug-ins to meet the needs of a variety of use cases and application environments. The messaging platform may reduce a dependency on proprietary commercial messaging technologies, and provides a proven platform and open standard protocols for portable and interoperable messaging.

According to one embodiment, the cloud application platform further includes a memory-oriented data management application, such as the VMware vFabric SQLFire available from VMware, Inc. The memory-oriented data management application provides high performance data access with horizontal scale. In one embodiment, the memory-oriented data management application may operate at memory speed, dynamically grow or decrease cluster size, and leverage existing SQL knowledge for accelerated application development.

According to one embodiment, the cloud application platform further includes a load-balanced web server application. In one embodiment, the load-balanced web server application may be used instead of a hardware load-balancer. According to certain aspects, multiple instances of load-balanced web server may be deployed and maintained with a variety of customizations needed. The load-balanced web server may enable quick installation and setup, provides up to 100% performance improvements with reduced deployment time, and provides optimized SSL management.

According to one embodiment, the cloud application platform further includes an application server, such as Apache Tomcat or an enterprise version of Tomcat such as VMware vFabric tc Server Spring Edition ("Spring Framework") available from VMware, Inc. The application server may have a lightweight footprint optimized for virtualized environments, may provide a lean platform for running modern applications, and may be well-suited for the virtualized datacenter. Due to its very small footprint and lean approach, the application server may generally require significantly less computing resources when compared to typical application servers, enabling greater application server density within a virtual environment. The application server may be integrated with virtualized toolkit such as VMware tools to enable easy deployment and management of applications.

In one embodiment, the virtualized infrastructure 120 may be managed by a virtualization management platform 122 (e.g., implemented as a process running in a virtual machine in one embodiment). In one embodiment, the virtualization management platform 122 may provide seamless end-to-end datacenter management through a set of APIs that enable integration with third-party management tools. The virtualization management platform 122 simplifies virtual datacenter operations across virtual and physical environments with "set and forget" policy-driven administration and automated IT processes for greater efficiency across a server deployment. In one example, one example of the virtualization management platform 122 may be the VMware vCenter virtualized management platform from available from VMware, Inc. of Palo Alto, Calif.

According to one embodiment of the present disclosure, the one or more virtual machines 140 may comprise a cloud application platform. Examples of the cloud application platform include the VMware vFabric cloud application platform available from VMware, Inc. The cloud application platform enables a fast, efficient and lightweight approach to building applications and running the applications on a virtualized and cloud-based infrastructure. According to one embodiment, the cloud application platform may work seamlessly with a virtualization engine, such as the VMware vSphere® available from VMware, Inc., making it well-suited for applications that need to scale dynamically to address unpredictable spikes in user demand.

According to one embodiment, the application server may be a Tomcat-compatible enterprise application server ideally suited for virtual environments. The application server may provide secure remote server administration via a web portal and command line and application configuration management. The application server may further include advanced diagnostics including, but not limited to, advanced error reporting and application thread lock detection and alerting. The application may further provide visibility into the performance of applications using local agents, for example such as utilizing Spring Insight to monitor performance of Java Spring applications. The application server may further include optimizations to allow for reduced memory consumption on the virtualized environment.

According to one embodiment, each of the virtual machines 140 may run a monitoring agent application, such as the Hyperic Agent available from VMware, Inc. The monitoring agent may be connected via a communications network to a corresponding monitoring server of the platform manager 130, described further below, and may be configured to monitor numerous servers and to monitor custom web applications wherever they may reside—physical machines, a virtual infrastructure environment, or public, private or hybrid clouds. By providing immediate notification of application performance degradation or unavailability, the monitoring agent applications enable system administrators to ensure availability and reliability of critical business applications.

According to certain aspects, the system may be utilized with virtualized clusters (e.g., clusters $126_1, 126_2, \ldots, 126_P$) running with distributed resource scheduler (DRS) active and set to run fully automatically. When there are performance issues with a cluster, the DRS may attempt its own remediation through the movement of existing virtual machines and their data from one host/data-store to another. The system as configured according to certain aspects of the present disclosure provides additional functionality through the capability of elastic growth of a cluster after DRS has taken its own steps to alleviate performance or status issues.

The computing platform 100 further includes a platform manager 130 connected to the virtualized infrastructure 120 and physical infrastructure 110 by the communications network. The platform manager 130 is configured to monitor performance, infrastructure resource consumption levels, and other requirements of the virtualized infrastructure 120 and/or the physical infrastructure 110, and responsive to the monitoring, execute a remediation process to provision additional computing resources according to techniques described herein. For example, if virtualized infrastructure 120 requires additional VMs to host newly deployed web applications or to scale currently running web applications to support peak performance demands, platform manager 130 can coordinate with the virtualization manager 122 to manage the instantiation and configuration of additional virtual machines to support such needs.

The platform manager 130 includes a monitoring component 132, a remediation component 134, and one or more monitoring policies 138 for monitoring the performance of the virtualized infrastructure 120 and physical infrastructure 110 according to techniques described herein.

According to one embodiment, the monitoring component 132 may be configured to continuously monitor applications on physical infrastructure 110, virtualized infrastructures 120, or cloud infrastructures. The monitoring component 132 provides monitoring of an application health based on a predefined response time or other metrics such as response time to detect issues before users may notice. In one embodiment, the monitoring component 132 communicates with a corresponding performance monitor (e.g., implemented as a locally-executing agent) running on each host or cluster of hosts monitored. The performance monitors periodically communicates with the monitoring component 132 and the virtualization manager 122 to provide real-time data about the state and status of a host and/or cluster. When, and if, any of the metrics defined above are met or exceeded, the remediator 134 may be triggered into action. In one example, the monitoring component 132 may be the VMware vFabric Hyperic Server available from VMware, Inc. as part of the VMware vFabric Cloud Application Platform.

According to one embodiment, the monitoring component 132 may be configured to auto-discover a variety of web application technologies (e.g., over 75 common web application technologies.) According to one embodiment, the monitoring component 132 may be configured to provide advanced alerting to reduce duplicate and irrelevant alerts while providing concise information on a wide range of performance metrics. According to one embodiment, the monitoring component 132 may be configured to provide scheduled control for administrative actions like restarting servers and running garbage collection routine. According to one embodiment, the monitoring component 132 may communicate with one or more monitoring agents running in the virtualized infrastructure 120, the one or more virtual machines 140, or in the physical infrastructure 110, as described above.

According to embodiments of the present disclosure, the monitoring component 132 enable system administrators to find, fix, and prevent performance problems in custom web applications, whether running on physical, virtual, or cloud infrastructures. The monitoring component 132 advantageously helps to resolve application problems quickly, reduce app downtime, and improve app performance—even for highly dynamic and elastic cloud applications, due to the ability of the monitoring component 132 to automatically discover infrastructure changes and provide complete visibility into the entire virtualized application stack and effortless handling of high volumes of performance, metrics, and automated remediation capabilities.

In one embodiment, the remediator component 134 may be configured to manage virtual and physical resources of the computing platform 100. In one example, the remediator component 134 may communicate with the infrastructure manager 112 in every physical infrastructure 110 to manage the configuration, provisioning, and compliance of computing-block based infrastructure. According to one embodiment, the remediator component 134 may be configured to provide elasticity, wherein computing resources are pooled and allocated/deallocated to different projects or running application instances as needed, without a disruption to running system. Elasticity as provided by the remediator component 134 advantageously maximizes resources utilized and reduces costs. According to one embodiment, the remediator component 134 provides an automatic elasticity wherein the allocation and de-allocation of resources are un-intrusive and automatic, based on monitoring of performance and pre-set policies. The automatic elasticity as provided by the remediator component 134 advantageously permits un-interrupted business in a volatile context at a use-base cost.

In one embodiment, the remediator component 134 may be configured to operate as proactive, or reactive, depending on the definition of the metric exceeded. For pro-active remediation, the goal is to provision a system consisting of CPU, network connectivity and storage but not to activate it. For re-active remediation, the goal is to activate a system and add it to an existing cluster known to the virtualization manager 122. The result of remediation is a either an additional host or a larger cluster with additional compute, network and storage resources.

In one embodiment, the remediator component 134 may communicate with the infrastructure manager 112 to provision and activate new systems. The remediator component 134 may further utilize a storage controller to enable the visibility of each cluster storage volume by each host. A server component is installed on the controller, which receives commands from the remediator component 134 to perform un-mapping when needed. According to one implementation, this server component may be custom written to execute the appropriate storage commands on the storage controller, such as Symmetrix, that is utilized. According to certain aspects, the remediation may be done through the custom script or code. In embodiments utilizing a DRS cluster, the custom program may also be configured to add the new host system, and create a new data store, on the newly provisioned storage While the platform manager 130 is depicted as a single entity in FIG. 1 for sake of discussion, it is understood that the platform manager 130 represents one or more server and/or server applications that may be implemented using a variety of architectures and configurations having multiple components, modules, and/or servers in communication. For example, the monitoring component 132 of the platform manager 130 may be implemented in one dedicated server, and the remediation component 134 of the platform manager 130 may be implemented in a separate interface.

Figure 2:
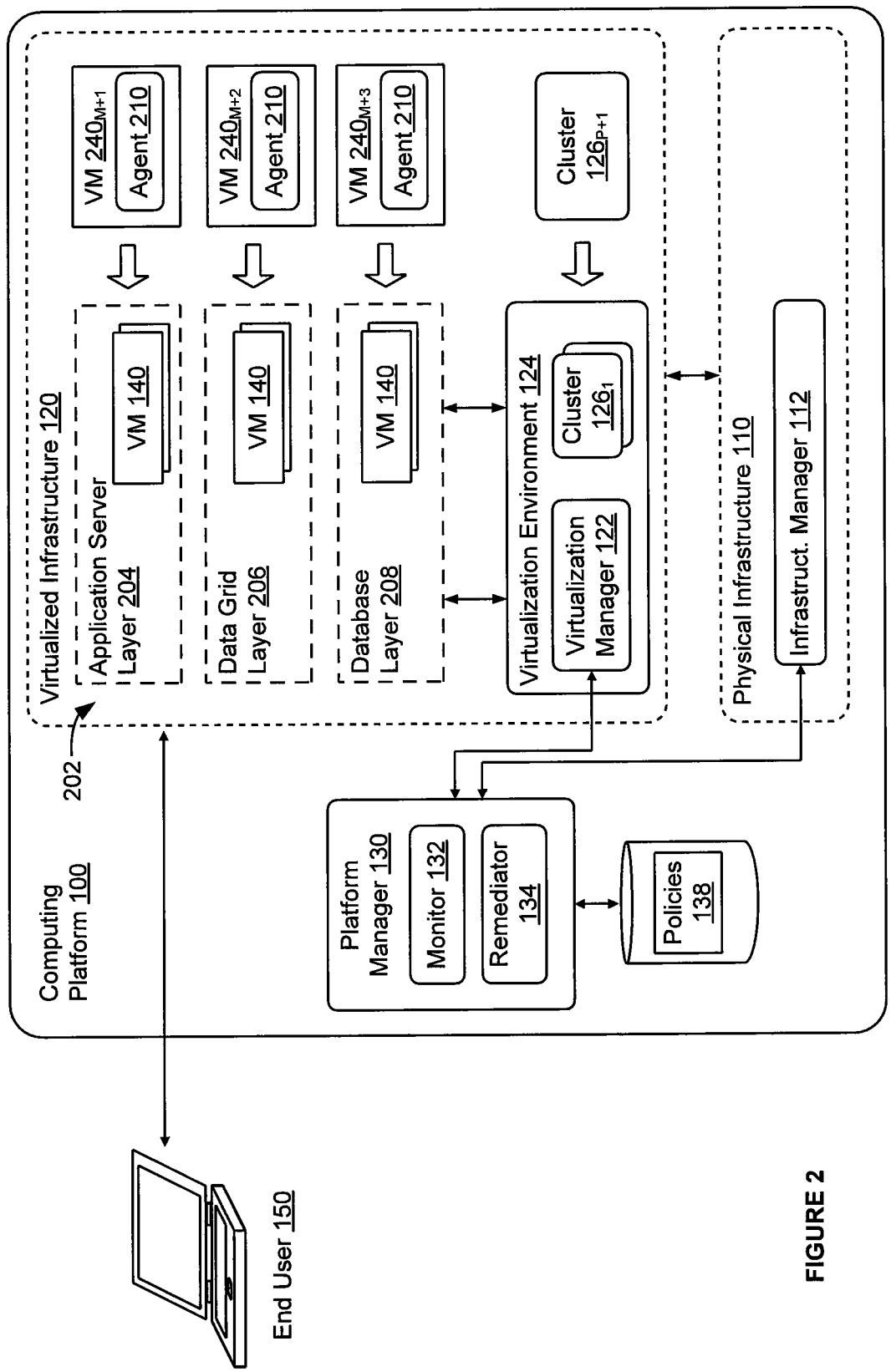
FIG. 2 illustrates an example of allocating virtualized resources in the computing platform of FIG. 1, according to one embodiment of the present disclosure.

FIG. 2 illustrates an example of allocating virtualized resources in the computing platform 100 of FIG. 1, according to one embodiment of the present disclosure. According to one embodiment, the architecture described herein provides elasticity in its infrastructure that enables enterprises to create an application, create a monitoring policy, and choose a development, test, and deployment environment, install, use, and monitor the application. The architecture may be configured to automatically scale up or scale down the application and environment, based on application and environmental performance. The architecture may be further configured to manage virtual and physical resources.

As shown, a sample application 202 comprising various components with a multi-tiered arrangement of parts. As shown, the sample application 202 includes an application server layer 204, a data grid layer 206, and a database layer 208. In one embodiment, the sample application 202 may be deployed and supported by the cloud application platform described above.

In one embodiment, the monitoring component 132 of the platform manager 130 is configured to monitor different application tiers via monitoring agents and then to collect the data. According to one embodiment, based on the collected data, one or more monitoring alerts may be utilized to trigger various provisioning remediation actions at both the virtual and the physical infrastructure layers. As shown, the computing platform 100 may provide for the provisioning of a new virtual machine 240 to the virtualized infrastructure 120. Additionally, the computing platform 100 may be configured to provision a new host 306 to the physical infrastructure, as described later in conjunction with FIG. 6.

Accordingly, the computing platform 100 provides elasticity both to the virtual environment (e.g., virtualized infrastructure 120) and the physical environment (e.g., physical infrastructure 110). The automation of the elasticity may require writing scripts or programs, and metrics for both environments and can be set up in the same monitoring policy.

Two exemplary use cases for the computing platform 100 are described in the present disclosure regarding how to automate applications and infrastructure elasticity—both on virtual servers and on the underlying physical servers. The two use cases employ a concept of automated application deployment. The use cases are driven by application-to-component characteristics such as static mapping and dynamic tuning, scaling, and elasticity. These application-to-component characteristics determines when to increase the size, resources, and capability of the environment to accommodate applications, and also addresses the following automated application deployment inputs considerations: application virtual provisioning (i.e., base configuration and elasticity configuration), application placement (e.g., testing and production), and automated setup of monitoring policies (e.g., which performance metric to monitor, what threshold levels of these metrics are critical, how long should the system tolerate the critical condition before taking a scaling and/or remediating action).

Elasticity of Application on Virtual Server (VMs)

Figure 3:
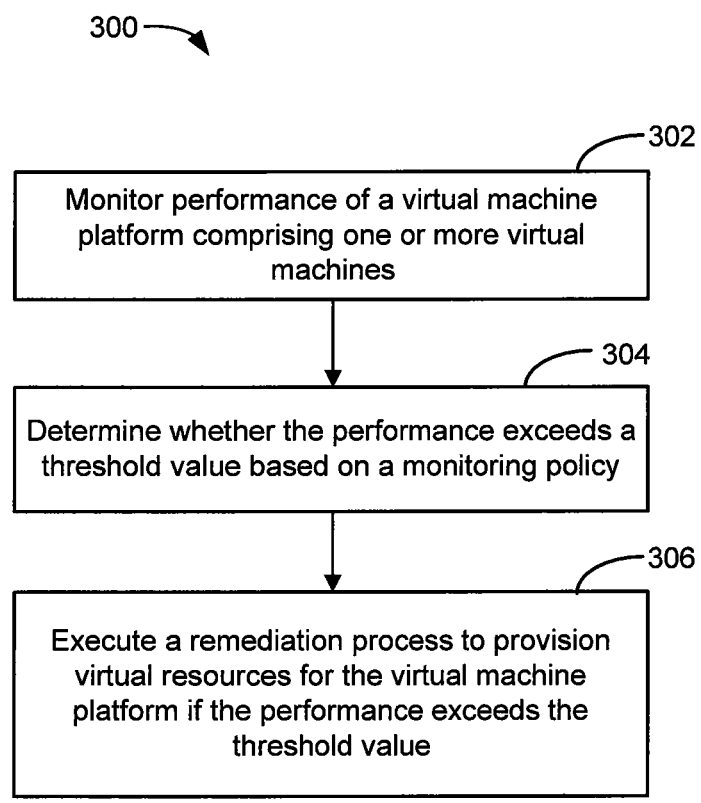
FIG. 3 is a flow diagram of method steps for allocating computer resources in a virtualized environment, according to certain aspects of the present disclosure.

FIG. 3 is flow diagram of method 300 for allocating computer resources in a virtualized environment, according to one embodiment of the present disclosure. In one embodiment, the method 300 may be configured to provide elasticity of applications on virtual servers such as virtual machines (VMs). Persons skilled in the art will understand that, even though the method 300 is described in conjunction with the systems of FIGS. 1-2, any system configured to perform the method steps, in any order, is within the scope of embodiments of the present disclosure.

As shown, the method 300 begins at 302, where the platform manager 130 monitors performance of a virtual machine platform comprising one or more virtual machines. The method 300 continues at 304, where the platform manager 130 determines whether the performance exceeds a threshold value based on a monitoring policy 138. According to one embodiment, the monitoring policies 138 may be created by Java code using the monitoring component API to automate and enable this use case. The policies are driven by the application metrics for scaling the application. The application policy configures the monitoring component 132 with the alerts specified to monitor the application and scale the application's group of VMs when the policy's thresholds are exceeded, as described below.

The method continues at 304, wherein the platform manager 130 may execute a remediation process to provision virtual resources for the virtual machine platform if the performance exceeds the threshold value. In one embodiment, the platform manager 130 may execute a remediation process to provision an additional virtual machine for the virtualized infrastructure 120. In one implementation, the monitoring framework described herein invokes scripts to create a new virtual application server (VM) from the application VM template. A script calls the virtualized management platform 122 through a set of APIs to create the additional VM (e.g., VM 240), as a clone of the existing VMs. The script may use special naming conventions for the new clones, and for the hosts running on them, so that it can separate the management of multiple groups of application VMs managed by platform manager 130.

Once cloned, a monitoring agent 210 on the new VM 240 notifies the monitoring component 132 of the platform manager 130 of its existence, thus platform manager 130 "discovers" and inventories the new VM 240. The monitoring policies now monitor the expanded group of VMs. Monitoring shows that application response time was improved after the new VM was added. The process of de-provisioning servers, when responding to reduced workload conditions, utilizes similar methods to reduce the number of VMs.

FIGS. 4A-E illustrate an example operation and corresponding user interfaces depicting system performance, according to certain embodiments of the present disclosure. In the example described herein for FIGS. 4A-E, a hotel booking application may be running. The hotel book application is a web based, load balanced application receiving data from users who are using it to make hotel reservations. The same application is running on an initial number of virtual machines (VMs), two VMs in this case, for scaling and performance reasons. As the requests are received into the application, a Load Balancer is handing off the requests (data) to the two front-end servers. A platform manager 130 is employed, and monitoring agents are located at each of the two front-end servers. The agents report performance data to the platform manager, and the platform manager then records the data, in this case CPU performance data.

Figure 4A:
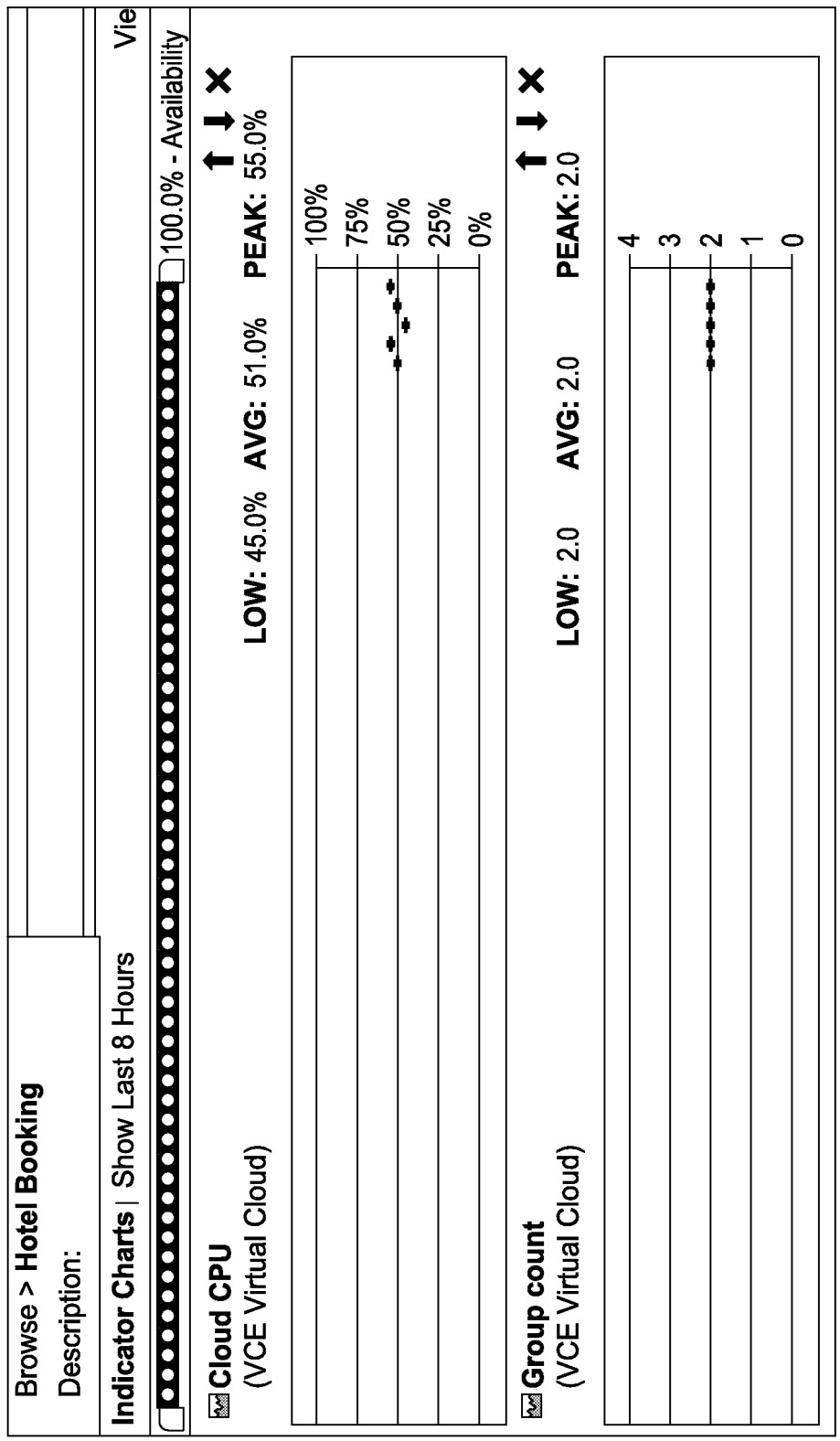
FIGS. 4A-E illustrate user interfaces depicting example operations, according to certain embodiments of the present disclosure.

FIG. 4A provides an illustration of the initial environment configuration. As shown, the CPU utilization is depicted at around 51%. According to one embodiment, alerts may be set on the calculated metric that calculates performance data for the application servers. Initially, the workload may fluctuate within the critical threshold specified but the system isn't reacting to this. If the application workload increases to a level that cannot be handled by the initial two VMs (base configuration), this load requires the creation of additional VMs.

Figure 4B:
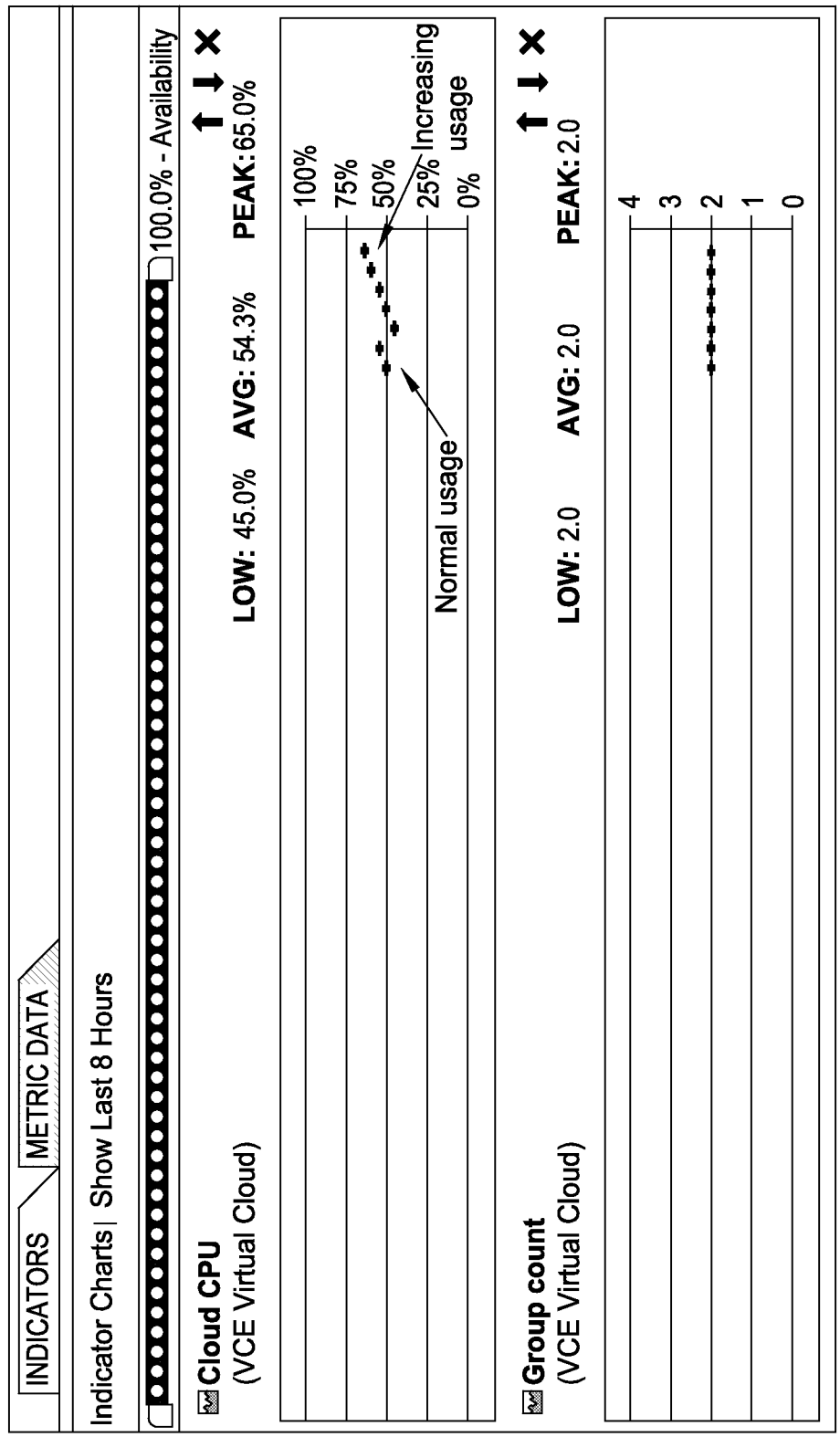

FIG. 4B illustrates CPU utilization of the example system wherein the group's CPU utilization is operating under normal load and then above a threshold load. According to one embodiment, a threshold CPU load level, and time duration have been programmatically set by a monitoring policy or other implemented configuration. When the monitored data shows the threshold load level has been reached for a predetermined duration, for example the CPU performance load is set at 60% utilization, and a duration of 5 minutes is set, then when the 60% has been observed to exists for 5 minutes, this condition indicates that the load growth has caused the system to run out of resources to handle additional loads.

Figure 4C:
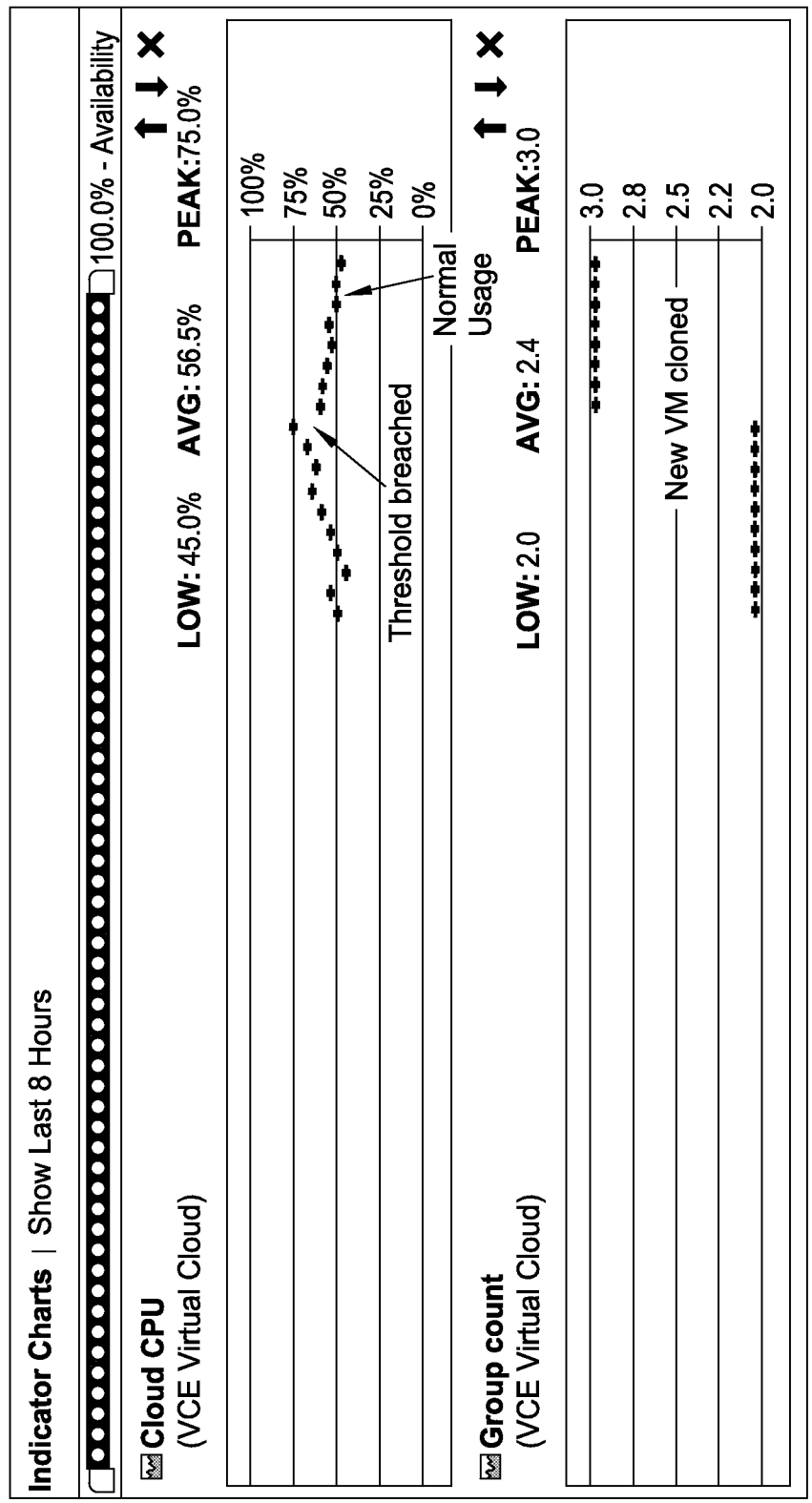

FIG. 4C illustrates CPU utilization of the example system after remediation procedure has been taken. According to one implementation, a script may be run which calls the API of the virtualization manager 122 to clone an additional VM server. This is the remediation step for the increased load. As shown, with the addition of the third VM, the load has leveled off and the CPU utilization has become reduced to acceptable levels. A recovery alert was fired to instruct the platform manager 130 to resume monitoring the metrics after the clone operation.

According to one embodiment, monitoring the new situation may reveal that the load levels off, but then continue to grow again. If the load repeatedly grows, then the number of application servers continues to expand and soon the system will need more physical servers to provision future application servers. At that point, techniques for provisioning more physical servers to manage the increased load, such as discussed in FIG. 8 below, may be utilized.

Figure 4D:
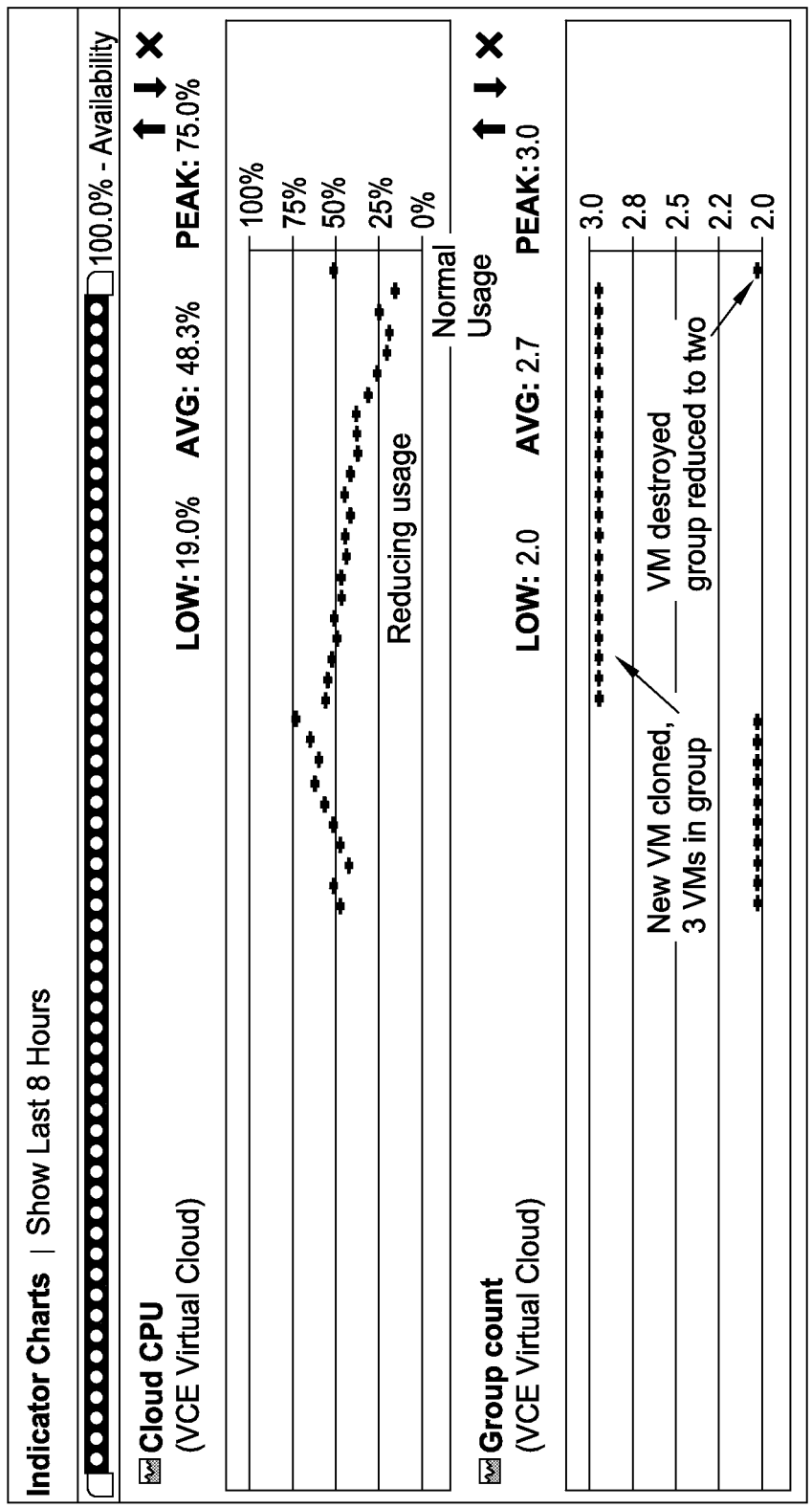
Figure 4E:
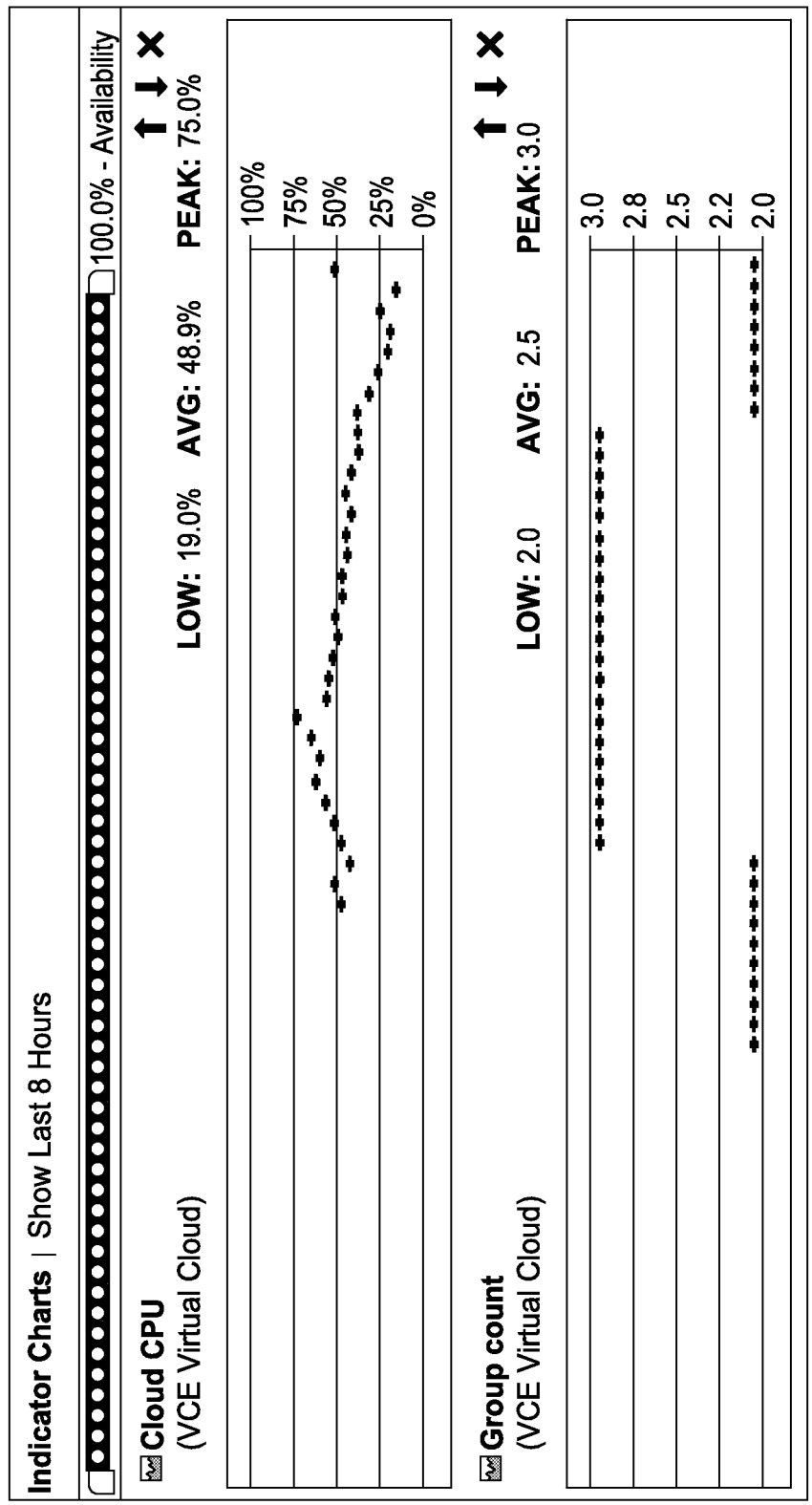

FIG. 4D illustrates CPU utilization of the example system after the remediation procedure has resulted in a reduction below low threshold, such that the new VM may be de-provisioned. In the example shown, after some time, the workload tapers off, to a level well below the high threshold. It has been determined that this is an acceptable behavior for the system, and it is not yet reacting to the reduced workload. But when the workload reduces below a low threshold, 20% in this example, and stays there for a user-specified period of time, for example, 1 or 5 minutes, then the system may take the action of de-provisioning VMs. As shown in FIG. 4D, there is a normal reduction in load, then a reduction below a low threshold value and then the load for the reduced number of VMs. FIG. 4E cumulatively illustrates the FIGS. 4A-D in a complete chart of the load according to one embodiment of the present disclosure.

FIG. 5 illustrates a user interface for displaying monitoring alerts and reports according to certain embodiments of the present disclosure. As shown, a report of cloning and recovery alerts fired may be provided to a user. The platform manager 130 may trigger remediation alerts, such as "On high Cloud CPU" or "On low Cloud CPU", when a threshold condition is breached. According to one embodiment, the platform manager 130 may then stop monitoring the condition and/or performance to prevent triggering duplicate clone operations. The platform manager 130 may fire recovery alerts, such as "On upscaling complete", after the new clones were detected, and platform manager 130 may resume monitoring the metrics for the new group.

According to one embodiment, the elasticity of the application virtual provisioning under increased load conditions may be demonstrated when, based on the monitoring policy, the platform manager 130 monitors a workload state measuring an application specific and then identifies the need for additional virtual application servers (VMs) when the application workload increases to a level that cannot be handled by the initial two VMs. The additional application servers may be then created and provisioned, and the application response time may then improve to the normal level.

According to one embodiment, when the application load reduces to an acceptable level, the system may wait a user-specified time period to confirm a further reduced load and may then take a reverse action of de-provisioning VMs. If needed, the demonstrated cycle of monitoring and de-provisioning may then continue until the environment is de-provisioned down to the initial VM count of two (i.e., the base configuration.)

Elasticity of Application on Underlying Physical Servers

Embodiments of the present disclosure provides techniques for enabling elasticity of the physical layer, when the virtual application workload in the examples provided above increases to the extent that more physical servers are required to handle the corresponding physical workload increase and its storage needs. In such an event, additional physical servers, and additional virtualized servers executing on top of those physical servers, may need to be provisioned. These additional provisioned physical servers, with the virtualized servers on them, may then be added to storage clusters.

Figure 6:
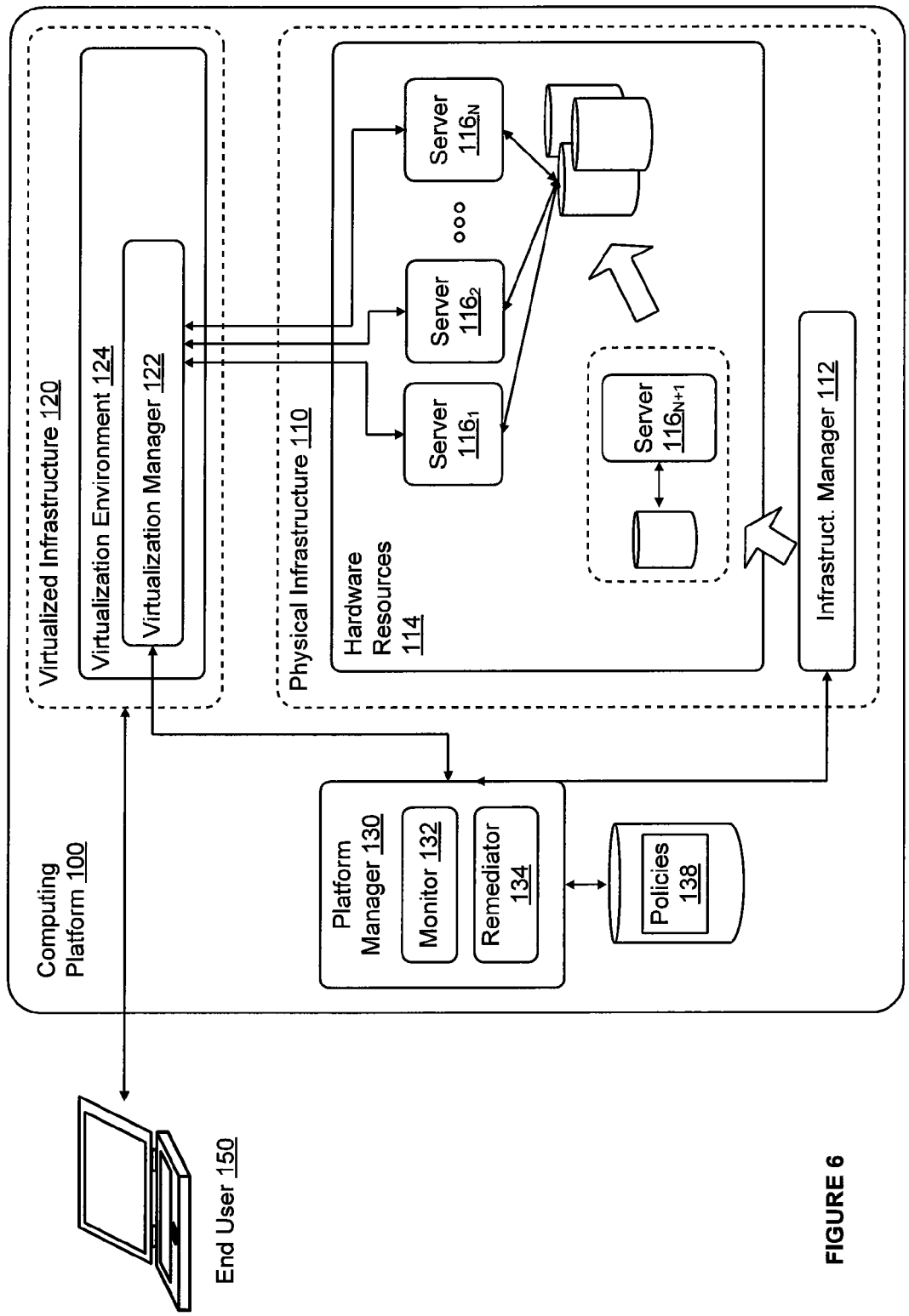
FIG. 6 illustrates an example of allocating physical resources in the computing platform of FIG. 1, according to one embodiment of the present disclosure.

FIG. 6 illustrates an example of allocating virtualized resources in the computing platform of FIG. 1, according to one embodiment of the present disclosure. According to one embodiment, the platform manager 130 utilizes policies to react to monitoring metrics from workload conditions, but the use of physical infrastructure metrics are gathered through periodically monitoring the physical workload state of one or more hosts. This could be a vCenter Distributed Resource Scheduler (DRS) cluster, as available from VMware, Inc., as in the example described below in the FIGS. 8A-B below.

Provisioning of physical resources may require an extended period of time. In embodiments utilizing a virtualization manager 122, the platform manager 130 may be configured to initiate the provisioning with an additional requirement to the remediator component 134 and/or infrastructure manager 112 to install a virtualized server on any new provisioned systems. A "re-active" state may be entered when there is an immediate demand for additional resources. According to embodiments, a custom program and/or script may be configured to activate the host that is provisioned in a "pro-active state". In embodiments including a virtualized cluster (e.g., a DRS cluster), the newly provisioned host and its resources may be added to the existing cluster, enabling that cluster to re-balance the workload across the new number of hosts.

According to embodiments of the present disclosure, the application lifecycle platform as described herein may be driven by a common set of policies 138. The automation code may parse a section of the policies 138 designated for physical elasticity to create rules that decide when additional physical resources are needed. A user may configure the policy 138 when setting up the virtualization environment 124. The policy 138 may be used to take several actions. The physical elasticity policy may describe one or more performance metrics having a threshold value, which may trigger remediation actions.

According to one embodiment, a virtualized cluster (e.g., vCenter DRS) may automatically load-balance and migrate parts of the applications to a newly provisioned physical server and its associated virtualized server, thus balancing the load. Infrastructure tasks, when completed, may result in the load of the cluster reduced back below threshold.

As described above, embodiments of the present disclosure provide elastic scaling of the underlying physical infrastructure. Such an automatic elasticity can be implemented in a variety of ways and is a fundamental component of a private cloud. Embodiments of the present disclosure may provide monitoring and remediation capabilities to elastically expand the physical resources of a cluster (e.g., vSphere cluster) based on application demand. The automatic elasticity leverages the capabilities of the platform manager 130 and virtualization manager 122 to track real-time performance of a cluster. When the elastic infrastructure recognizes that a condition exists requiring remediation, the elastic infrastructure according to embodiments of the present disclosure automatically coordinates the elastic expansion of, for example, a cluster. The automatic elasticity orchestrates this expansion, using the infrastructure manager 112 and storage array controller, just-in-time to satisfy application needs.

According to certain aspects, the platform manager 130 and virtualization manager 122 may be instrumented in a variety of ways to implement monitoring and provisioning capabilities for the infrastructure. This instrumentation can form a library that monitors performance and selected cluster metrics to determine when the system should proactively provision new CPU, networking, and storage resources for a cluster. The instrumentation attempts to have, in parallel, both a "proactive" and a "reactive" system in place. The system may functions in a "proactive" mode to have resources provisioned and ready for activation simultaneously when the point of most urgent need arrives. The system may additionally also operate in a "reactive" mode so that if the urgent need becomes immediate, the infrastructure immediately provisions (if needed), and activates, a new system.

Figure 7:
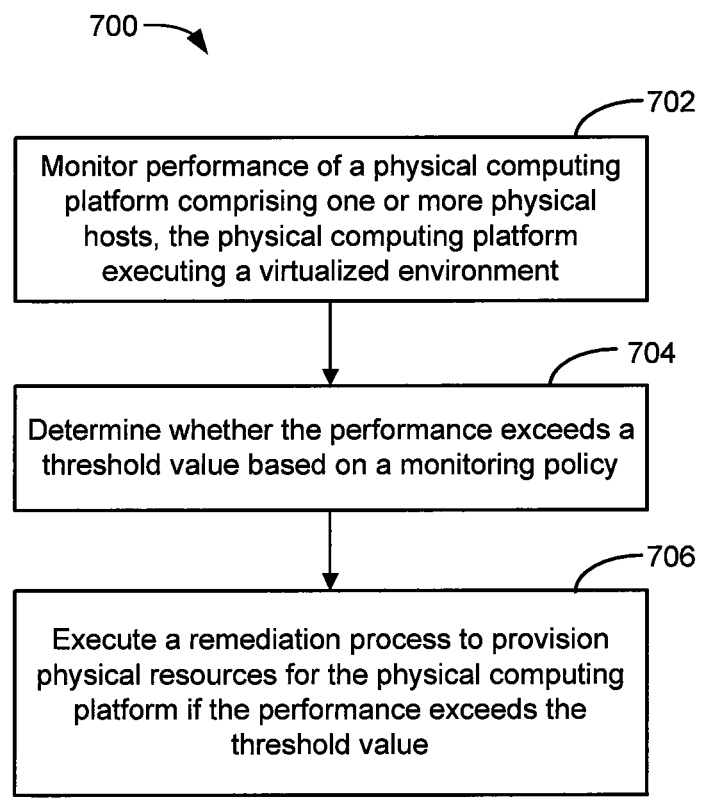
FIG. 7 is a flow diagram of method steps for allocating computer resources in a virtualized environment, according to certain aspects of the present disclosure.

FIG. 7 is flow diagram of method 700 for allocating computer resources in a virtualized environment, according to one embodiment of the present disclosure. In one embodiment, the method 700 may be configured to provide elasticity of the application on the underlying physical servers. Persons skilled in the art will understand that, even though the method 700 is described in conjunction with the systems of FIGS. 1, 2, and 6, any system configured to perform the method steps, in any order, is within the scope of embodiments of the present disclosure.

As shown, the method 700 begins at 702, where the platform manager 130 monitors performance of the computing platform 100. According to embodiments of the present disclosure, a variety of metrics may be monitored, according to each computing environment, and depending on the type of workload run, and whether that workload is CPU intensive, or memory intensive, I/O intensive, or some combination. In one embodiment, a set of metrics may be selected that identify two conditions related to the host or hosts the workload runs on. In a first condition, a "pro-active" condition may be determined that indicates a workload is growing and, if the workload continues at the same rate, at some point will require additional CPU, memory, or I/O resources for the workload to continue operating at the same rate of performance. This threshold value results in the provision of additional physical servers 116 with virtualized servers (e.g., VM 140) installed on the physical servers 116 via the infrastructure manager 112, and the provisioned additional servers 116 are then placed in a standby pool.

In a second condition, a "re-active" condition may be determined that indicates that a workload has grown to the point that requires additional CPU, memory or I/O resources. Metrics may be defined with a time period over which the metric threshold is compared. For example, a CPU metric set to 90% over 8 hours means that the metric is exceeded when CPU consistently averages over 90% over an 8 hour period.

By setting up proactive and reactive metrics, either directly using the monitoring component 132, or indirectly by writing a program, which queries the monitoring component 132 for metrics, it may be detected when either state occurs. The proactive state enables the initialization of the process of physical provisioning by the infrastructure manager 112 before the workload actually requires additional resources. According to certain aspects, custom applications, scripts, and/or programs may be written that that calls the API interfaces of the infrastructure manager 112 when the proactive state is detected. According to one embodiment, the custom applications may be capable of using any metric available from the monitoring component 132 in monitoring a host.

According to certain aspects, the metrics may trigger remediation in the context of a time interval. CPU usage, for example, may exceed its defined threshold as an average over a well-defined period of time. If CPU usage is configured to 90% and the time interval is set to 8 hours, then CPU usage for the entire cluster of hosts must exceed 90% for the last eight hours before remediation is triggered. These values can be set for individual metrics according to what works best for a given environment.

In embodiments utilizing a virtualized cluster infrastructure, several cluster-level metrics may be utilized to trigger elastic growth. In one implementation, the cluster-level metrics include, but are not limited to: a general cluster status (e.g., "red" or "yellow") which is the same status seen through the vSphere client; a cluster CPU usage, representing a high-level percentage threshold of the total effective MHz of CPU usage by a cluster's physical hosts; a cluster memory usage, representing a high-level percentage threshold of the total effective memory usage by a cluster's physical hosts; a cluster hosts usage, representing a high-level percentage threshold of the effective usage of all available hosts; a datastore usage, representing a high-level percentage threshold of the total use of the datastores available to the cluster.

The method 700 continues at 704, the platform manager 130 determines whether the performance exceeds a threshold value based on a monitoring policy 138. At 706, the platform manager 130 executes a remediation process to provision physical resources (e.g., computing resources, storage, network services) for the computing platform 100 if the performance exceeds the threshold value. In one embodiment, when a metric threshold is exceeded, the computing platform 100 configured with the platform manager 130 can begin remediation. The metrics defined above can be specified separately for each level. According to one embodiment, two levels of remediation may be supported.

In one embodiment, pro-active remediation may be supported such that the configured system pro-actively recognizes a future need to expand a cluster. In this type of remediation, CPU, network and storage hardware resources are provisioned from the computing-block physical platform, but not activated. Those resources remain in a stand-by pool once provisioned, and are activated re-actively, or when an immediate demand is detected.

In another embodiment, re-active remediation may be supported such that the configured system searches for pre-provisioned resources and attempts to use those for an immediate demand to expand a cluster. If such resources are available, they are immediately activated and added to the cluster in need of additional hardware resource. If pre-provisioned resources are not available for a re-active remediation, then the configured system attempts to immediately provision and activate those resources.

According to one embodiment, the blades, storage, and networking to be used in the system architecture may be graded before use. This grading may be a requirement provided by the infrastructure manager 112, wherein only similar model blades may be used. By way of example, computing resources may be graded as "EXAMPLE_POOL" using the user interface of the infrastructure manager 112. Similarly, the storage and network intended for the system are also graded "EXAMPLE_POOL." A customized label name may be created, for example, such as "ALM_POOL". According to one embodiment, before such a system can successfully provision and activate storage, a service offering named "EXAMPLE_SERVICE_OFFERING" may be created using the user interface of the infrastructure manager 112. A customized name may also be created, for example, such as "ALM_SERVICE_OFFERING". In one implementation, the service offering may be defined to use one blade from the ALM_POOL, and two storage volumes from the ALM_POOL: a boot device and a data device. A single network interface card (NIC) may be defined which provides network access to the virtualization manager 122. The service offering may also be defined to install a virtualized environment (e.g., VMware ESX 4.1) onto a newly provisioned system.

Figure 8B:
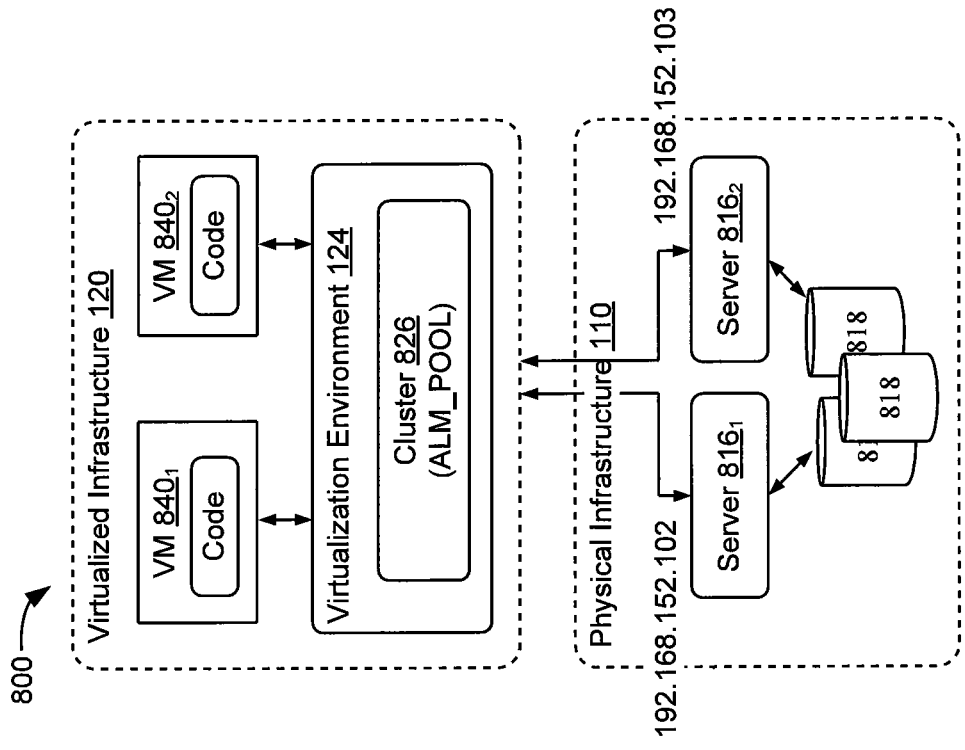
FIG. 8A-B illustrate an exemplary computing system configured for providing a virtualized environment, according to one embodiment of the present disclosure.
Figure 8A:
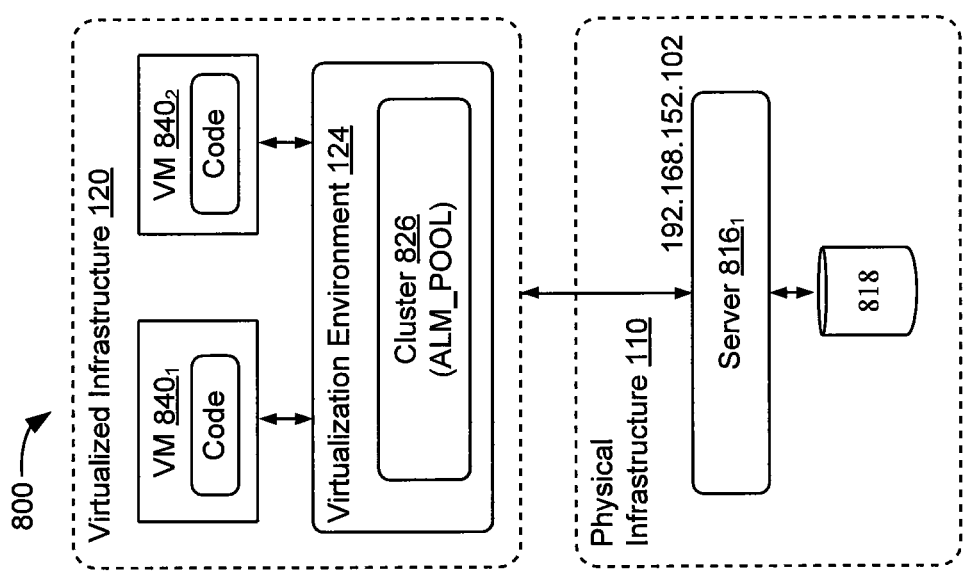

FIGS. 8A-B illustrates an exemplary computing system 800 configured for providing a virtualized environment, according to one embodiment of the present disclosure. While the exemplary computing platform may be configured to operate based on a variety of metrics, for sake of discussion, the exemplary computing platform 800 depicted in FIGS. 8A and 8B are configured to provide automatic elasticity to expand the physical size of a cluster 126 managed by the virtualization manager 122 based on CPU performance. As such, the example in FIGS. 8A and 8B shows how CPU load can influence elastic growth.

In the example illustrated in FIG. 8A, an initial environment 800 may include a cluster 826 managed by the virtualization manager 122 (e.g., and labeled "ALM_POOL") which is set to load balance automatically using an aggressive policy. It may be assumed that a feature for live migration of virtual machines, such as vMotion available from VMware, Inc., is enabled. The cluster 826 is backed by one physical host $816_1$ supporting the virtualization environment 124 (e.g., VMware ESXi 4.1). In the specific example, the physical host 816 runs on IP address of 192.168.152.102. There are two virtual machines (e.g., $840_1$ and $840_2$) running on the physical host $816_1$. In the present example, the VMs run identical test code which creates a CPU load on the virtual machines and the physical hosts. Combined, it has been determined that the test code running on both virtual machines 840, contributes approximately 70% to the CPU load of the physical host 816.

According to some embodiments, the system of FIG. 8A continually monitors performance metrics of physical hosts and status of clusters. The configured policy 138 of this example indicates that stand-by provisioning be initiated when CPU load averages over 50% over an 8 hour period. For clarity, in this example, this stand-by provisioning is assumed to have occurred, and that there is one physical host system on stand-by.

When CPU load averages over 70% over an 8 hour period, activation provisioning is initiated. The configured system of FIG. 8A automatically adds a new physical host $816_2$ to the virtualization manager 122. The configured system 800 may also configure a Distributed Virtual Switch, activates the live migration feature (e.g., vMotion), and sets the time/date to match the single host $816_1$ already in the cluster 826. After a few moments, the load may be quickly re-balanced across the increased number of physical hosts (e.g., $816_1$, $816_2$). It may be assumed that the load re-balancing may be done automatically by DRS, and that one of the two identical virtual machines (e.g., $840_1$ or $840_2$) is migrated to the new physical host 8162.

FIG. 8B illustrates the computing environment 800 after remediation, according to one embodiment of the present disclosure. As shown, after adding the new host $816_2$, as described above, the cluster 826 named ALM_POOL, and managed by the virtualization manager 122, is elastically extended to include two physical hosts (e.g., $816_1$ and $816_2$) with increased shared storage 818. In the specific example described above, the initial physical host $816_1$ continues to run on IP address 192.168.152.102, and the newly provisioned and activated host $816_2$ runs on IP address 192.168.152.103. As such, there continue to be two virtual machines (e.g., $840_1$ and $840_2$) running on the cluster 826 such that one VM runs on one host and the second VM on the other host. It has been determined that the addition of the new host $816_2$ causes a decrease in activity on the first host $816_1$ as the load has become balanced after the addition of the new host. I has been further determined the total available MHz of CPU increases as the new host is added, while the total CPU usage in MHz remains constant but gets balanced across two hosts instead of one. It has been determined that operation of the techniques described herein cause a drop off in utilization due to the migration of one of the two virtual machines (e.g., $840_1$ and $840_2$) to the new host $816_2$.

According to embodiments of the present disclosure, the configured system may be able to monitor physical hosts operating in the context of a DRS managed cluster. When performance metrics, such as CPU load, exceed desired thresholds, the configured system provides the functionality to automatically expand the size of the compute environment elastically in order to meet needed demand. In the example provided above, monitoring indicated a need to elastically add another host.

Accordingly, embodiments of the present disclosure provide a solution architecture for application lifecycle platform that utilizes a virtualized computing-block infrastructure (e.g., Vblock Infrastructure Platforms available from VCE Company, LLC.) and virtualized cloud application platform (e.g., vFabric Cloud Application Platform available from VMware, Inc.) to provide the needed platform for modern applications from design to development, testing, staging, deployment, and management. Embodiments of the present disclosure provide IT control over quality of service and security, while providing application owners and developers with flexibility, as well as instant access to resources for addressing application demand fluctuation.

As described herein, automatic elasticity provides applications with additional capacity, as needed, and removes the capacity when no longer needed. The freed capacity can be used by other applications that enable balanced use of resources among applications. As such, automatic elasticity lowers the operational cost per application. The solution architecture as described herein may be built using components such as Vblock platform with Hyperic, vCenter, and UIM.

Embodiments of the present disclosure were described that automate provisioning steps using Vblock platform and VMware management tools in order to provide automatic elasticity. In one embodiment, monitoring running applications for increased workload may trigger proactive and reactive response. In one embodiment, the triggered proactive or reactive response includes taking the necessary remediation action upon workloads exceeding set thresholds, as set in policies. According to one embodiment, the objectives of the present disclosure were met by demonstrating the automatic elasticity of the Vblock Solution for Application Lifecycle Platform through two uses cases described above which successfully illustrate how metrics, gathered from monitoring application demand fluctuation, can be utilized based on configured policies to provide automatic elasticity. When the system needs additional resources, the elastic environment provides them, and also provides management of virtual and physical server resources.

Embodiments of the present disclosure provide several benefits to enterprises developing for the cloud. Embodiments of the present disclosure advantageously assist enterprise IT solve capacity planning issues and reduces IT manual interventions to adjust to growing demands. Embodiments of the present disclosure allow for simplified and streamlined acquisition of hardware (e.g., network, compute, storage) and software (e.g., application development tools, and an application management tool.) Embodiments of the present disclosure advantageously provide management software that enables automation, deployment, and elastic control over the hardware and software. Embodiments of the present disclosure provide turnkey, ready to use, application development components in the front end, middle tier, and back end for customers to rapidly build and deploy web-applications. Additionally, certain embodiments of the present disclosure reduced total cost of ownership (TCO) of a computing platform, as well as provide proactive business agility through application and infrastructure monitoring.

Various embodiments of the present disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

While the foregoing is directed to embodiments of the present disclosure, other and further embodiments of the present disclosure may be devised without departing from the basic scope thereof, and the scope thereof is determined by the claims that follow.

The invention claimed is:

1. A method for allocating computer resources, the method comprising:

monitoring a performance metric of a physical computing platform comprising one or more physical resources, the physical computing platform executing a virtualized environment;

assigning each physical resource of the one or more physical resources to one of a plurality of pools according to a type of the physical resource;
determining a projected performance metric of at least one physical resource of the one or more physical resources, the at least one physical resource of a first pool of the plurality of pools, the projected performance metric based on a rate of change of the monitored performance metric, the projected performance metric comprising an estimated future performance metric of the at least one physical resource;
determining, based on the monitored performance metric, whether the projected performance metric will meet a threshold value;
identifying one or more additional physical resources from the first pool but not of the physical computing platform when identified and that are the same type as the at least one physical resource; and
executing a remediation process to provision the one or more additional physical resources for the physical computing platform to change the projected performance metric below the threshold value.

2. The method of claim 1, wherein the physical computing platform further comprises a computing-block-based physical infrastructure.

3. The method of claim 1, wherein the remediation process comprises:
determining, based on the monitored performance metric, whether the monitored performance metric exceeds the threshold value; and
activating the physical resources to improve the performance metric below the threshold value.

4. The method of claim 1, wherein the remediation process comprises:
pre-configuring the physical resources for the virtualized environment; and
allocating the physical resources to a standby pool.

5. The method of claim 1, wherein the remediation process comprises:
activating the provisioned one or more additional physical resources into the physical computing platform for executing the virtualized environment.

6. The method of claim 1, wherein monitoring the performance metric comprises the threshold value and a threshold time interval.

7. The method of claim 1, wherein the virtualized environment comprises a virtualized cluster comprising one or more virtualized machines.

8. The method of claim 7, wherein the remediation process comprises:
activating a provisioned physical host for executing the virtualized environment; and
adding the provisioned physical host to the virtualized cluster.

9. The method of claim 1, wherein the monitored performance metric comprises at least one of a cluster status, a cluster CPU usage, a cluster memory usage, a cluster hosts usage, and a datastore usage.

10. A method for allocating computer resources, the method comprising:
monitoring a performance metric of a virtual machine platform comprising one or more virtual machines;
assigning each virtual machine to one of a plurality of pools according to a type of the virtual machine;
determining a projected performance metric of at least one virtual machine of a first pool based on a rate of change of the monitored performance metric, the projected performance metric comprising an estimated future performance metric of the at least one virtual machine;
determining, based on the monitored performance metric, whether the projected performance metric will meet a threshold value;
identifying one or more additional virtual machines from the first pool that are the same type as the at least one virtual machine; and
executing a remediation process to provision the one or more additional virtual machines for the virtual machine platform to change the projected performance metric below the threshold value.

11. The method of claim 10, wherein the remediation process comprises:
determining whether the monitored performance metric meets the threshold value based on monitoring the performance metric; and
activating a virtual machine having virtual computing resources selected to reduce the performance metric below the threshold value.

12. The method of claim 10, further comprising:
determining whether the performance metric falls below another threshold value based on monitoring the performance metric; and
de-provisioning at least one of the virtual machines if the monitored performance metric falls below the other threshold value.

13. The method of claim 10, further comprising:
triggering a remediation alert if the performance metric meets the threshold value; and
pausing the monitoring of the performance metric while the remediation process is being executed.

14. The method of claim 10, further comprising:
determining whether the performance metric continues to meet the threshold value after executing the remediation process; and
executing a second remediation process comprising provisioning of further additional virtual machines for a physical computing platform if the performance metric continues to meet the threshold value.

15. A computer system, comprising:
a storage device configured to store one or more monitoring policies, and a management server configured to:
monitor a performance metric of a physical computing platform comprising one or more physical resources, the physical computing platform executing a virtualized environment;
assign each physical resource to one of a plurality of pools according to a type of the physical resource;
determine a projected performance metric of at least one physical resource of the one or more physical resources, the at least one physical resource of a first pool of the plurality of pools, the projected performance metric based on a rate of change of the monitored performance metric, the protected performance metric comprising an estimated future performance metric of the at least one physical resource;
determine, based on the monitored performance metric, whether the projected performance metric will meet a threshold value;
identify one or more additional physical resources from the first pool that are the same type as the at least one physical resource, the one or more additional physical resources not of the physical computing platform when identified; and
execute a remediation process to provision the one or more additional physical resources for the physical computing platform to change the projected performance metric below the threshold value.

16. The computer system of claim 15, wherein the management server is further configured to:
   determine whether the performance metric falls below another threshold value based on the monitoring policy; and
   de-provision at least one of the physical resources if the monitored performance metric falls below the other threshold value.

17. The computer system of claim 15, wherein the management server is further configured to:
   trigger a remediation alert if the performance metric meets the threshold value; and
   pause the monitoring of the performance metric while the remediation process is being executed.

18. The computer system of claim 15, wherein the management server is further configured to:
   determine whether the performance metric continues to meet the threshold value after executing the remediation process; and
   execute a second remediation process comprising provision of additional physical resources for a physical computing platform if the performance metric continues to meet the threshold value.

19. The computer system of claim 15, wherein the type of the physical resource comprises a model type of the physical resource.

* * * * *